(12) United States Patent
Horesh

(10) Patent No.: US 11,500,090 B2
(45) Date of Patent: Nov. 15, 2022

(54) APPARATUS AND METHOD FOR OBSTACLE DETECTION

(71) Applicant: R-Go Robotics LTD, Caesarea (IL)

(72) Inventor: Nizan Horesh, Caesarea (IL)

(73) Assignee: R-Go Robotics LTD, Caesarea (IL)

( * ) Notice: Subject to any disclaimer, the term of this patent is extended or adjusted under 35 U.S.C. 154(b) by 793 days.

(21) Appl. No.: 16/444,492

(22) Filed: Jun. 18, 2019

(65) Prior Publication Data

US 2020/0400818 A1     Dec. 24, 2020

(51) Int. Cl.
*G01S 17/04*     (2020.01)
*G01S 17/89*     (2020.01)
*G06T 7/73*     (2017.01)
*G01S 17/08*     (2006.01)

(52) U.S. Cl.
CPC .............. *G01S 17/04* (2020.01); *G01S 17/08* (2013.01); *G01S 17/89* (2013.01); *G06T 7/74* (2017.01)

(58) Field of Classification Search
CPC ................................ G01S 17/04; G06T 7/74
USPC .......................................................... 356/4
See application file for complete search history.

(56) References Cited

U.S. PATENT DOCUMENTS

| | | | |
|---|---|---|---|
| 5,040,116 A | 8/1991 | Evans, Jr. et al. | |
| 9,002,511 B1 | 4/2015 | Hickerson et al. | |
| 2015/0168954 A1* | 6/2015 | Hickerson | G05D 1/0248 901/1 |
| 2015/0194059 A1* | 7/2015 | Starr | G08G 5/0017 701/3 |
| 2018/0222382 A1* | 8/2018 | Inoue | B60R 19/483 |

OTHER PUBLICATIONS

International Search Report and Written Opinion dated Aug. 13, 2020 for International Application No. PCT/IL2020/050646, 8 pages.

* cited by examiner

*Primary Examiner* — Amir Shahnami
(74) *Attorney, Agent, or Firm* — Schwabe, Williamson & Wyatt, P.C.

(57) ABSTRACT

Apparatuses, methods and storage media associated with surface traversing by robotic apparatuses with an obstacle detection system are described herein. In some instances, the obstacle detection system is mounted on the body of the apparatus, and includes one or more light sources, to illuminate the surface to be traversed; a camera, to capture one or more images of the illuminated surface; and a processing device coupled with the camera and the light source, to process the captured one or more images, to detect, or cause to be detected, an obstacle disposed on the illuminated surface, based at least in part on a result of the processing of the images. Other embodiments may be described and claimed.

18 Claims, 13 Drawing Sheets

APPARATUS AND METHOD FOR OBSTACLE DETECTION

TECHNICAL FIELD

The present disclosure relates to the field of robotics, in particular, to apparatuses and methods associated with our of plane obstacle detection and recovery for surface traversing machines.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Detecting obstacles on a surface is a common problem for machines that traverse a surface, such as, for example, wheeled robotic apparatuses. A conventional solution for this problem involves using a dedicated depth sensor, for example, depth camera, LIDAR etc., to detect an obstacle on the traversed surface. However, the conventional solution may prove costly and inefficient.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Apparatuses, methods and storage media associated with surface traversing by robotic apparatuses with object (e.g., obstacle) detection system are described herein. In some instances, the obstacle detection system is mounted on the body of the apparatus, and includes one or more light sources, to illuminate the surface to be traversed; a camera, to capture one or more images of the illuminated surface; and a processing device coupled with the camera and the light source, to process the captured one or more images, to detect, or cause to be detected, an obstacle disposed on the illuminated surface, based at least in part on a result of the processing of the images.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
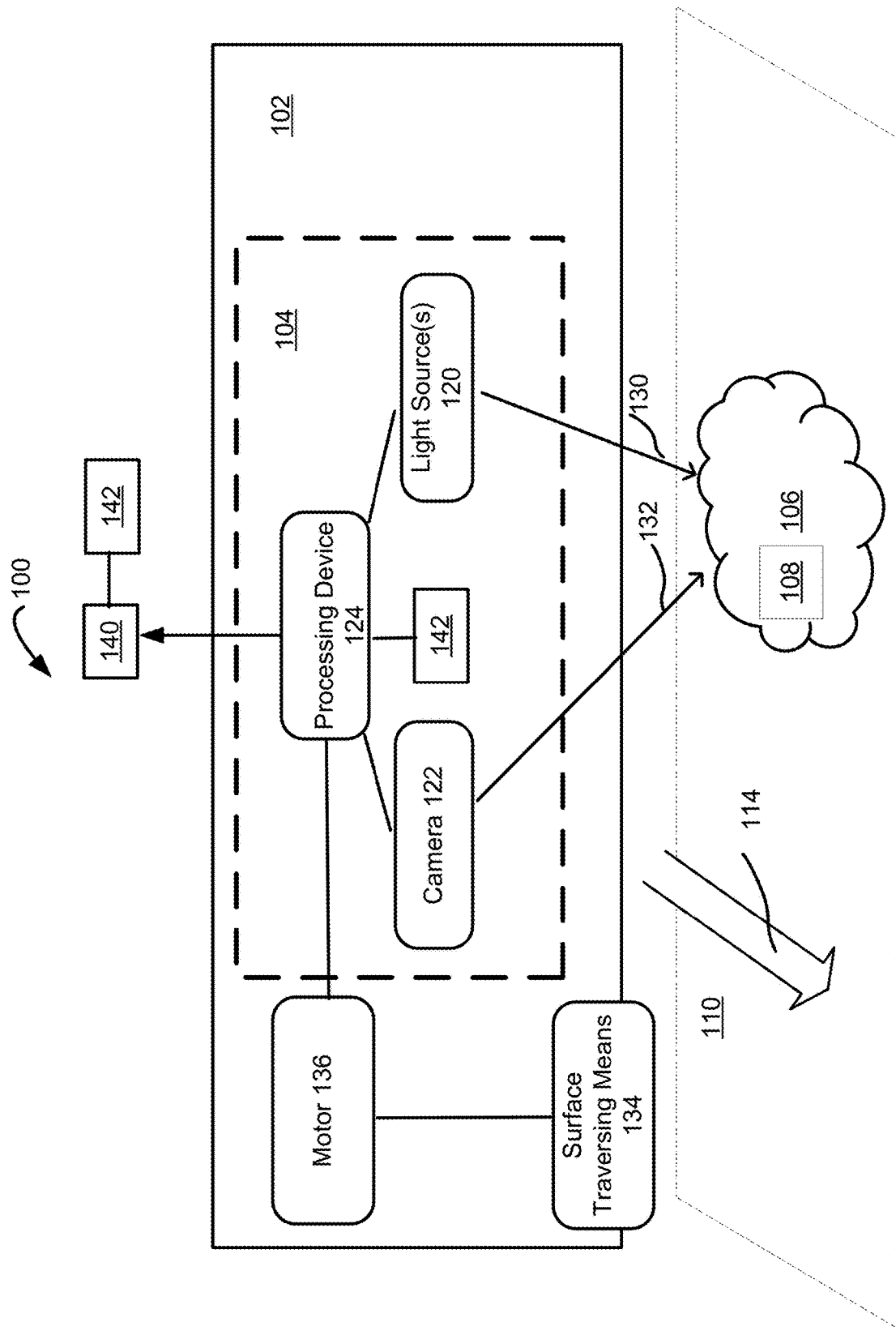
FIG. 1 is a block diagram illustrating an example apparatus for surface traversing, configured with an obstacle detection system, in accordance with some embodiments.

FIG. 1 is a block diagram illustrating an example apparatus for surface traversing, configured with an obstacle detection system, in accordance with some embodiments. In embodiments, the apparatus 100 includes a body 102 configured to traverse a surface 110 at least in a direction of traverse 114.

In embodiments, the apparatus 100 further includes an obstacle detection system 104 configured to detect obstacles (e.g., obstacle 108) on the surface 110. The obstacle detection system 104 may be mounted or otherwise disposed on the body 102 of the apparatus 100. In embodiments, the system 104 includes one or more light sources 120, to illuminate 130 the surface 110 (or at least a portion of the surface 106) to be traversed. The system 104 further includes a camera 122, to capture 132 one or more images of the illuminated surface portion 106. The system 106 also includes a processing device 124 coupled with the camera 122 and the light sources 120. The processing device 124 is configured to process the captured images of the surface portion 106, to detect, or cause to be detected, an object (e.g., obstacle) 108 disposed on the illuminated surface portion 106, based at least in part on a result of the processing of the images, according to the embodiments described herein.

For example, the processing device 124 can be configured to identify or cause to be identified the obstacle 108 on the surface portion 106, based at least in part on the processed images, and adjust or cause to be adjusted a trajectory (e.g., direction 114, speed, and/or the like) of the surface traversing by the apparatus 102, based at least in part on the detected obstacle 108. In embodiments, the processing device 124 may comprise some or all of the components of a computing device, described below in reference to FIG. 12.

More specifically, the processing device 124 may be configured to implement various embodiments of the obstacle detection process disclosed herein. For example, the processing device 124 is configured to control the illumination of the surface by the light sources 120, corresponding image capturing by the camera 122, and processing the captured images according to techniques described herein. In other words, the processing device 124 may be configured with a module 142 (e.g., software, firmware, or a combination thereof) that implements the obstacle detection techniques described herein. In some embodiments, the processing device 124 is configured to provide obstacle detection, based on the instructions 142. In some embodiments, the processing device 124 is configured to pre-process the captured images and communicate the results to an external device 140 for further processing and obstacle detection according to the module 142 (e.g., the module 142 can be implemented as software executed on the external device 140).

In embodiments, the apparatus 100 may include other components necessary for surface traversing. For example, in some embodiments, the apparatus 100 includes a surface traversing means (e.g., wheels) 134, and a motor 136 to operate the surface traversing means 134. In embodiments, the motor 136 may be disposed inside the body 102. The processing device 124 can be further configured to control the motion of the apparatus 100 (e.g., by controlling the motor 136 operation), based at least in part on the results of obstacle detection and its dimensions estimation.

In embodiments, the obstacle detection techniques implemented by the obstacle detection system 104 are based on the following considerations. Within the visible spectrum, the dominant interactions of light and matter are reflectance and absorption. Reflectance from most of the materials in the natural world can be described well by Lambert cosine law, which states that a surface has the same radiance when viewed from any angle. When a light source is illuminating a Lambertian surface, the radiant light intensity, as observed (measured) by a camera, is directly proportional to the cosine of the angle between the direction of the incident light and the surface normal:

$$I = \frac{I_L}{z^2} \alpha \, \hat{n}_L \cdot \hat{n}_S \tag{1}$$

Where I is the radiant intensity, z is the distance from the light source, $I_L$ is the luminous intensity of the light source, $\alpha$ is the absorption coefficient, $\hat{n}_L$ is the direction (unit vector) between the surface and the light source, and $\hat{n}_S$ is the normal vector (unit vector) to the surface.

Note that $\hat{n}_L$ corresponds to the ray from the imaged pixel to the camera entrance pupil. $I_L$ can be known from calibrating the light source. Therefore, the above equation includes four variables, namely z, $\alpha$, and two degrees of freedom (DOF) values from $\hat{n}_S$ (since $\hat{n}_S$ is a unit vector). It is evident that four measurements of 1 with different calibrated light sources can resolve (assuming functional independency) the four unknown DOF values, and thus provide an estimate for the distance and the normal to the object (e.g., object surface) as well as the reflection coefficient. The estimations of the distance and the normal to the object can be utilized to provide an estimation of a distance to an obstacle, and the obstacle's dimensions (e.g., height, depth, or the like). Accordingly, the techniques described above may be applied in robotic apparatuses (e.g., 100) that traverse surfaces with obstacles, in order to detect the obstacles and estimate their dimensions. The obstacles can comprise, for example, surface anomalies, such as unevenness or obstructions on the surface, an edge of the surface, such as a cliff, a bluff, a precipice, or an escarpment, or the like. The described embodiments provide for detecting obstacle using an off-the-shelf camera and simple and low cost illumination sources.

Figure 2:
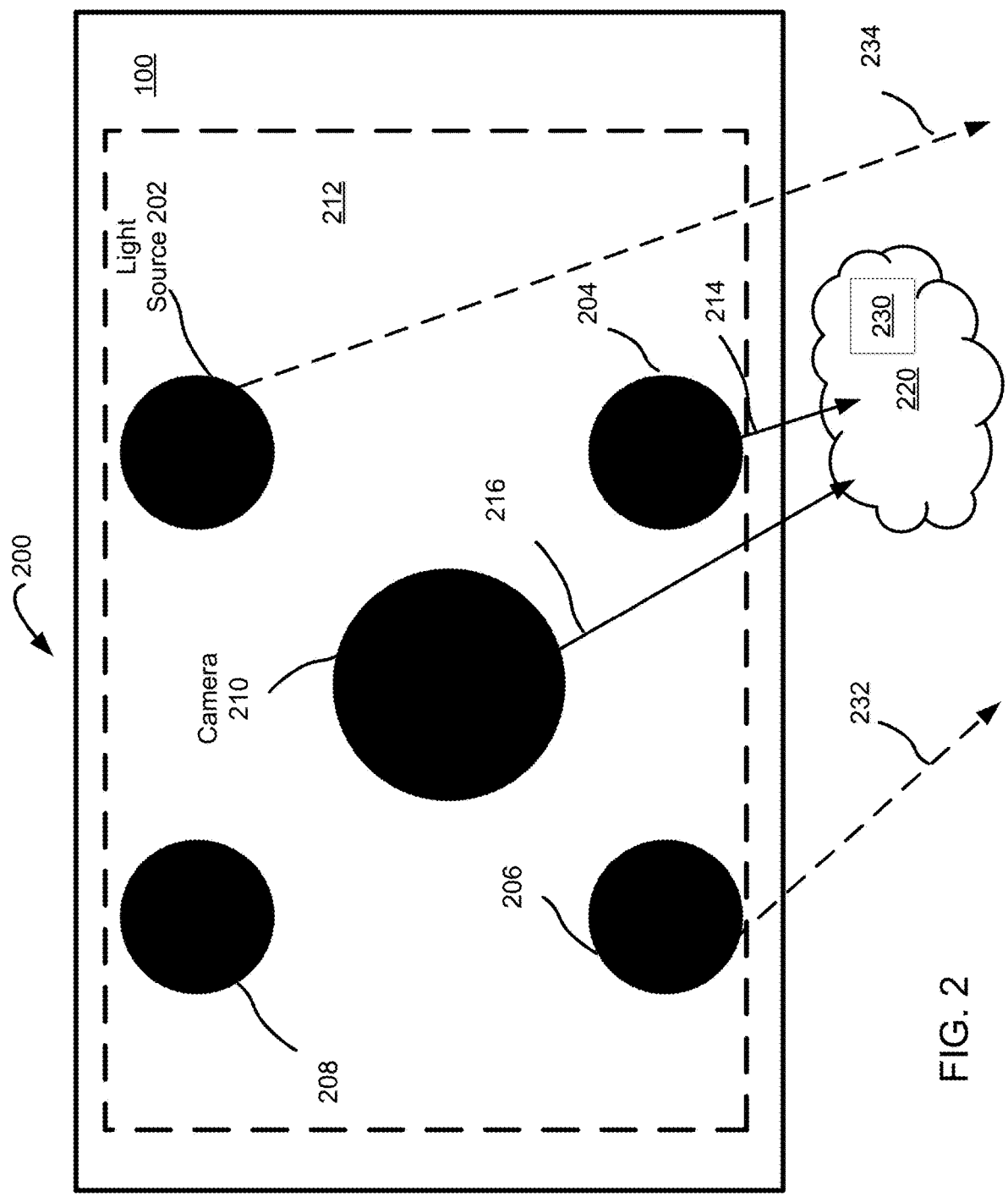
FIG. 2 is an example configuration of an obstacle detection system that can be mounted on a robotic apparatus for surface traversing, in accordance with some embodiments.

FIG. 2 is an example configuration of an obstacle detection system that can be mounted on a robotic apparatus for surface traversing, in accordance with some embodiments. Specifically, the obstacle detection system 200 corresponds to the system 104 described in reference to FIG. 1, and may be mounted on the robotic apparatus 100. The processing device of the system 200 is omitted from FIG. 2 for ease of understanding.

A front view of the obstacle detection system 200 is shown in FIG. 2. In embodiments, the system 200 includes lights sources (e.g., point light emitters) 202, 204, 206, and 208 viewed from the front, e.g., shown as projecting light from out of the page, to illuminate the surface portion 220 with obstacle 230. The surface portion 220 with obstacle 230 are shown in 2D space for ease of understanding. For example, light source 204 is shown illuminating 220 with light 214.

The system 200 further includes a camera 210, also directed out of the page in FIG. 2. The lights sources 202, 204, 206, and 208 can be disposed at different locations on a body 212 of a robotic apparatus (e.g., 100), as long as they illuminate the surface in front of (in direction of traverse) by the apparatus. Similarly, the camera 210 can be disposed anywhere on the body 212, as long as the camera is capable to capture (as indicated by 216) the surface portion 220 illuminated by any (or all) of the light sources 202, 204, 206, and 208. In other words, there are no restrictions regarding co-planarity of the relative disposition of the light sources, or the relative disposition of the light sources and the camera on the body 212 of the apparatus 100. In embodiments, the camera 210 and the light sources 202, 204, 206, and 208 share a common field of view (FOV) or field of illumination, schematically indicated by arrows 232, 234.

In operation, the processing device (shown in FIG. 1) can command the camera to take multiple (in embodiments, at least four) images of the traversed surface in sequence, each image taken with different combination of the light sources turned on. For example, a first image of the surface may be captured with only the light source 202 on, a second image may be captured with only the light source 204 on, a third image may be captured with only the light source 206 on, and a fourth image may be captured with only the light source 208 on.

Figure 3:
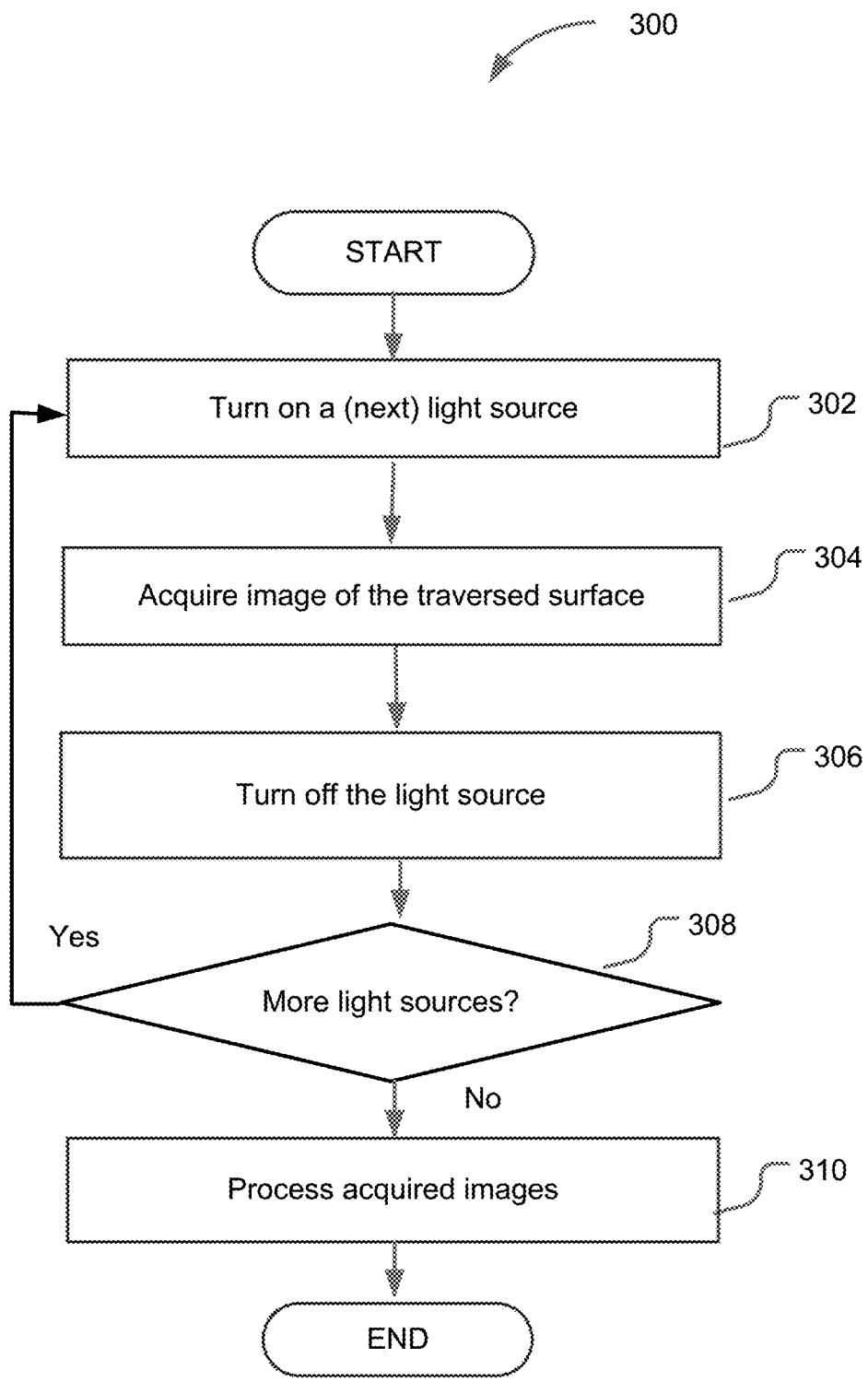
FIG. 3 illustrates a process of operation of the obstacle detection system of FIGS. 1-2, in accordance with some embodiments.

FIG. 3 illustrates a process of operation of the obstacle detection system of FIGS. 1-2, in accordance with some embodiments. As noted, the obstacle detection system may be mounted on a robotic apparatus, such as apparatus 100. The process 300 may be performed by a processing device of the obstacle detection system, such as the device 124 of FIG. 1.

At block 302, the processing device causes a first light source (e.g., 202), or a first combination of light sources (e.g., 202 and 204) to turn on.

At block 304, the processing device causes a camera (e.g., 210) of the obstacle detection system to acquire an image of the surface traversed by the robotic apparatus.

At block 306, the processing device causes a first light source (e.g., 202), or a first combination of light sources of the obstacle detection system to turn off.

At decision block 308, the processing device determines whether there are any light sources in the system that have not been turned on and off for the purposes of surface image capturing.

If more light sources remain to be operated for the purposes of surface image capturing, the process 300 reverts to block 302, where a next light source of the obstacle detection system (e.g., 204), or a next combination of light sources (e.g., 202 and 206) is turned on, and the process 300 continues as described above. If all light sources (or all combinations of light sources, totaling four) have been used (e.g., 202, 204, 206, and 208) and corresponding surface images captured, the process moves to block 310, where the images are processed to detect an obstacle on the traversed surface as described below.

The detection of obstacles on a traversed surface using the obstacle detection system of FIG. 2 can be accomplished in view of the following. In a setup of FIG. 2, the time period between the acquisition of the image is small compared to the motion of the scene and camera. A time period between capturing of two successive images of the first, second, third, and fourth images comprises a value that provides for a motion of a same object in the scene (having a corresponding pixel present in the two successive images) that does not exceed a pixel motion threshold. In other words, the time period may be such that the motion of the illuminated objects (such as an obstacle) in the scene and relative to the camera is small in the camera plane.

For example, in a sequence of images, a pixel that represents the same physical location on an object can move not more than a threshold. In embodiments, the threshold may comprise two-four pixels. In some embodiments, the threshold may comprise less than one pixel. The four captured images of the surface provide four measurements for each pixel, and thus allow solving z, $\alpha$, $\hat{n}_S$ in equation (1), to determine a light intensity reflected by the object exterior surface in response to the illumination in succession by the light sources, based on the corresponding images, and identify geometric parameters associated with the object exterior surface (geometry of the scene).

Once the geometry of the scene is identified, by solving equation 1, it is possible to find the 3D structure of the traversed surface by fitting (using regression, for example) a plane-curve surface to the estimated geometry, and identify the regions that do not lie on the traversed surface, e.g., regions with distance from the surface greater than a predefined threshold. The 3D structure of the surface (e.g., object surface) can be described by the distance and the normal to (every?) a point on a surface. This is a full description of the surface and the geometrical information possible to extract using a camera. The surfaces (e.g., object surfaces) are limited to the ones that are observable from the camera. i.e., the camera cannot observe the back of an object or its internal structure.

The threshold may be determined based on the mechanics of the robotic apparatus, such as for example, what height of the object on a traversed surface is considered as an obstacle for the apparatus.

Further constraints can be applied since, for a continuous and smooth surface z=f(x, y), and $\forall f \times \hat{n}_S = 0$, i.e., the gradient of the surface e.g., object surface) is parallel to the object surface normal. This constraint to the surface geometry adds these two equations and therefore, reduces the number of the required measurements to two instead of four required for solving equation (1). In the setup of FIG. 2, it is assumed that the reconstructed surface is piecewise smooth, i.e. smooth except for isolated 1d boundaries. Solving the equation under such assumption is usually done using non-linear optimization techniques, e.g., using a minimal graph-cut.

In some embodiments, the obstacle detection system of FIG. 2 may include additional depth sensor (e.g. stereo camera, LIDAR), so the depth z can be known, at least at some location of pixels corresponding to the illuminated regions of the scene. In this example, only three light sources for three illumination configurations, three corresponding images, and corresponding measurements are needed. If it is assumed that the surface is smooth (as described above) only one light source and corresponding measurement may be needed. Some embodiments may include using multiple cameras and thus may be able to acquire multiple images at a single time. The above description provides a method to estimate geometry of a scene using active illumination. This method can be applied to obstacle detection by a robotic apparatus traversing a surface.

In some embodiments, obstacle detection for a robotic apparatus configured to traversed a surface may be achieved using a single image capturing a surface in front of the apparatus (without additional sensors). An example configuration of an obstacle detection system configured to detect an obstacle based on an image of a surface in front of the apparatus is described in reference to FIGS. 4-10.

Figure 4:
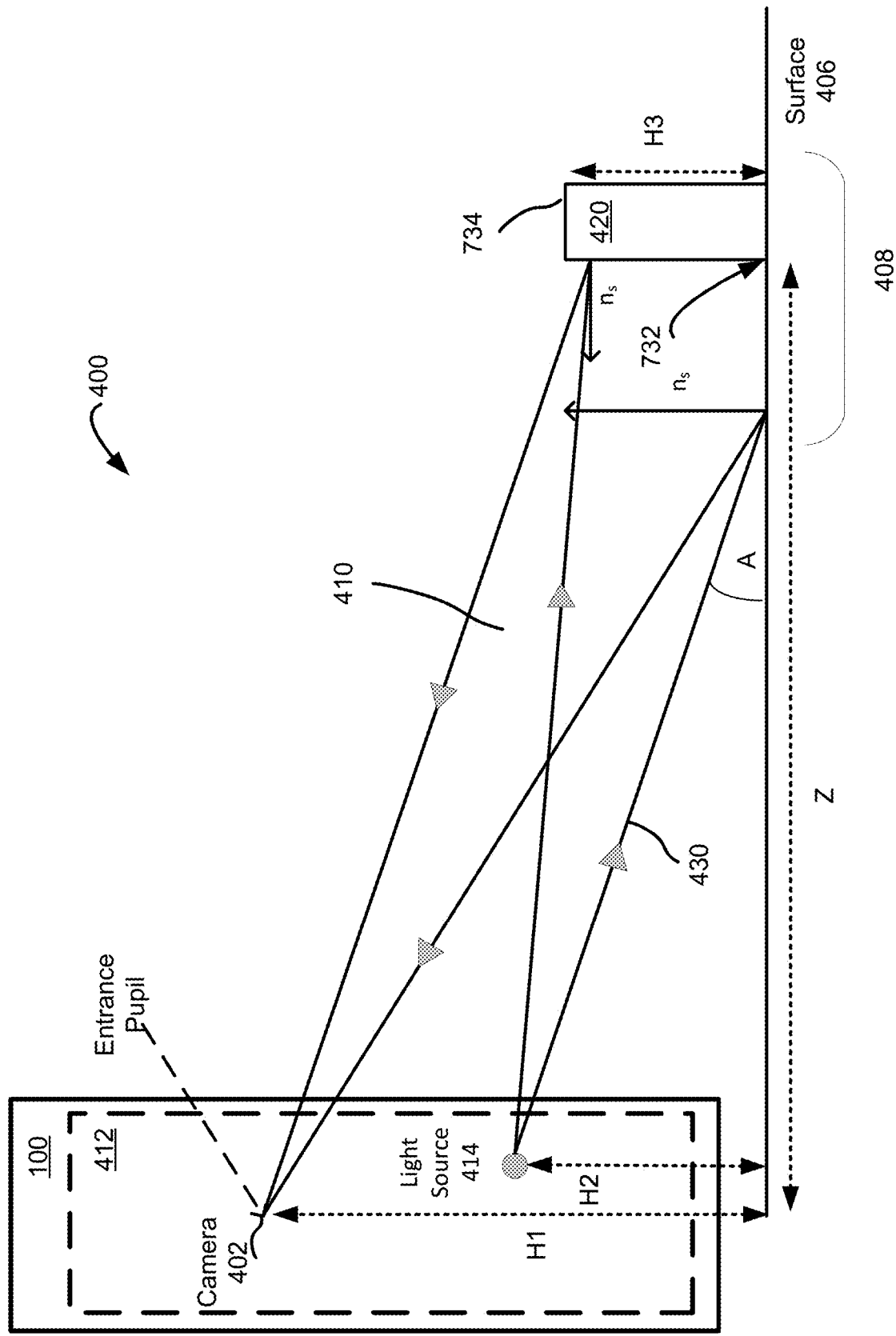
FIG. 4 is a schematic side view of an example obstacle detection system mounted on a robotic apparatus, in accordance with some embodiments.

FIG. 4 is a schematic side view of an example obstacle detection system mounted on a robotic apparatus, in accordance with some embodiments. Specifically, the obstacle detection system 400 corresponds to the system 104 described in reference to FIG. 1, and may be mounted on a robotic apparatus 100 as shown in FIG. 1. The processing device of the system is omitted from FIG. 4 for ease of understanding.

In embodiments, the system 400 includes a camera 402 disposed on a body 412 of a robotic apparatus 100 such that it has significant part (e.g., portion 408 of the traversed surface 406 within its field of view 410. The system 400 further includes, an illumination light source 414 disposed on the body 412 of the apparatus 100. In embodiments, the system 400 can include multiple light sources; only one source 414 is shown in FIG. 4 for purposes of clarity. The light source 412 is disposed on the body 412 such that it illuminate the field-of-view 410 (or at least a part of it) of the traversed surface 406. As shown, the light source 412 illuminates the surface 406 (with the ray 430) at an acute angle A. No other restrictions to the mutual disposition of the camera 402 and light source 414 are applicable to the system 400, as long as the illuminated objects (e.g. obstacle 420) are within the field of view 410.

Due to the geometrical setup of the system 400, the reflected light from the surface 406 plane is significantly smaller than the reflected light from an object (e.g., obstacle) 420 disposed on the surface 406. For example, consider a camera (e.g., 402) disposed on the body 412 at a distance (height) H1 above the surface 406 plane. For example, H1 can be about 5 cm above the surface 406. Consider further a light source (e.g., 414) disposed on the body 412 at a distance (height) H2 above the surface 406 plane. For example, H2 can be about 3 cm above the surface 406. In general, the camera 402 is disposed above the light source 414 relative to the surface 406. The obstacle 420 is disposed on the surface 406 at a horizontal distance Z from the camera 402. For example, Z can be about 40 cm. From equation (1) it can be shown that, under Lambertian assumption, the intensity of light reflected from the obstacle surface is more than 13 times greater than the light intensity reflected from the traversed surface.

$$\frac{I_{obstacle}}{I_{surface}} = \frac{\cos\left(a\tan\left(\frac{3}{40}\right)\right)}{\cos\left(\frac{\pi}{2} - a\tan\left(\frac{3}{40}\right)\right)} = \frac{40}{3} \text{ (approx. 13)} \quad (2)$$

Wherein I_obstacle is the light intensity from obstacle (420), as imaged by the camera (402) and I_surface is the light intensity from traversed surface (406), as imaged by the camera (402). Here we only consider light that is originated from the light source (414) (i.e. not including reflected ambient light). Due to the geometric setup and the Lambertian scattering high contrast between the object and the surface (and background) may be obtained. The high contrast provides for detection of the obstacle.

Figure 5:
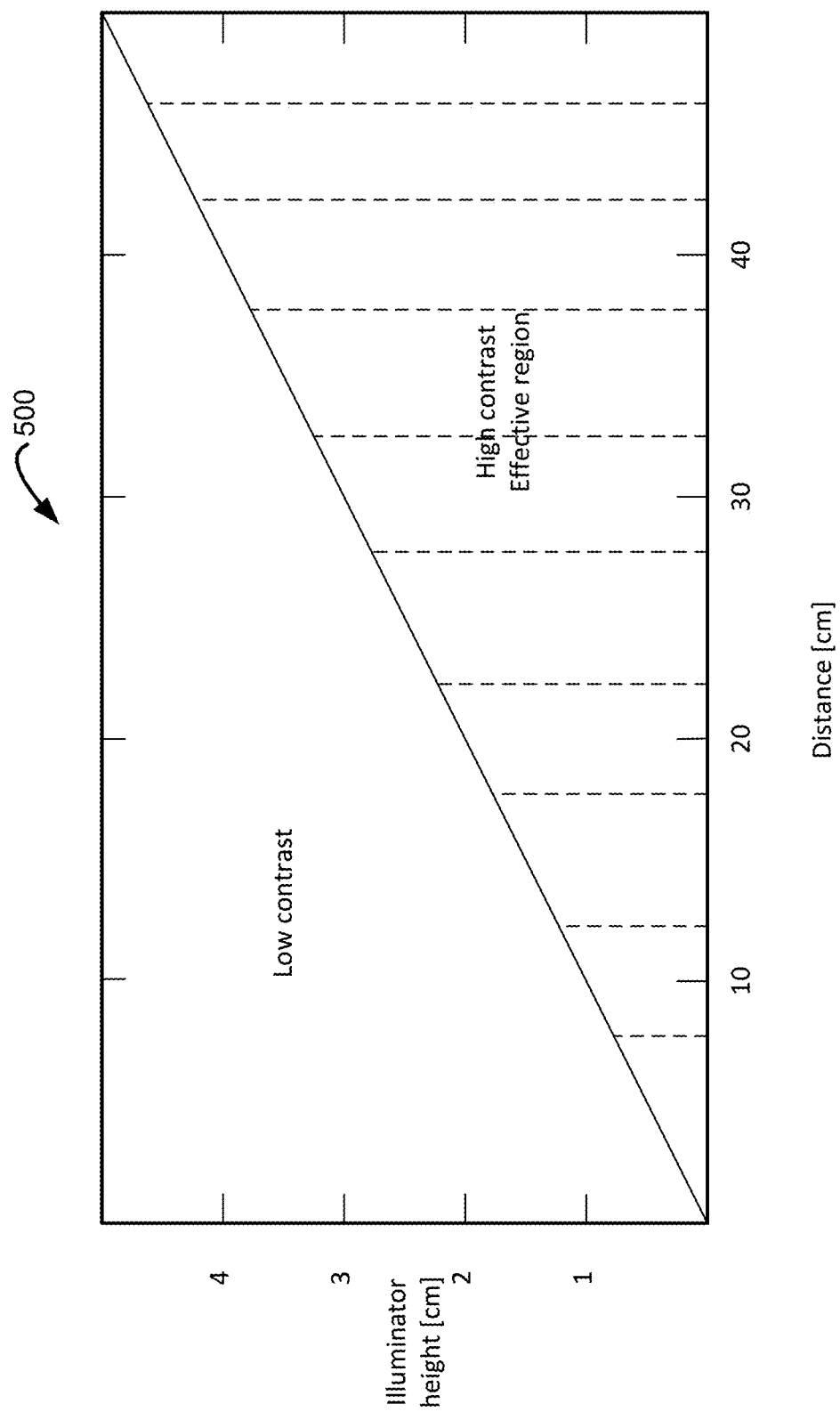
FIG. 5 is an example graph showing the effective region of operation for an obstacle detection system as a function of geometrical parameters, in accordance with some embodiments.

FIG. 5 is an example graph showing the effective region of operation for an obstacle detection system as a function of geometrical parameters, in accordance with some embodiments. Specifically, graph 500 illustrates a height H2 of a light source above the illuminated surface as a function of a distance D between the camera and the object (obstacle) disposed on the surface. As shown in graph 500, to provide an effective region of operation (e.g., desired high contrast) the height of the light source above the illuminated surface needs to be significantly smaller (e.g. three times smaller) than the distance between the camera and the observed object (obstacle). It is assumed that the height of the camera is similar to the height of the illumination source above the surface. Note that the measurement units (cm) are provided in FIG. 5 for purposes of explanation.

Accordingly, to achieve sufficient contrast, a distance D between the obstacle and the camera can be at least three times greater than a distance H2 between a light source and the surface. In other words, a ratio between distance D and H2 is important for the above considerations. The distance H1 between the camera and the surface can be inferred because the relative location of the camera 402 and the light source 414 on the body 412 of the apparatus 100 is known. The distance H1 is important in a sense that it needs to be low enough (e.g., similar to the distance H2 and the height H3 of the obstacle 420) such that the object-surface contrast is sufficiently high. It should be evident that due to the high contrast for the obstacle to the surface intensity an optical setup allows easy detection of out-of-plane objects.

Figure 6:
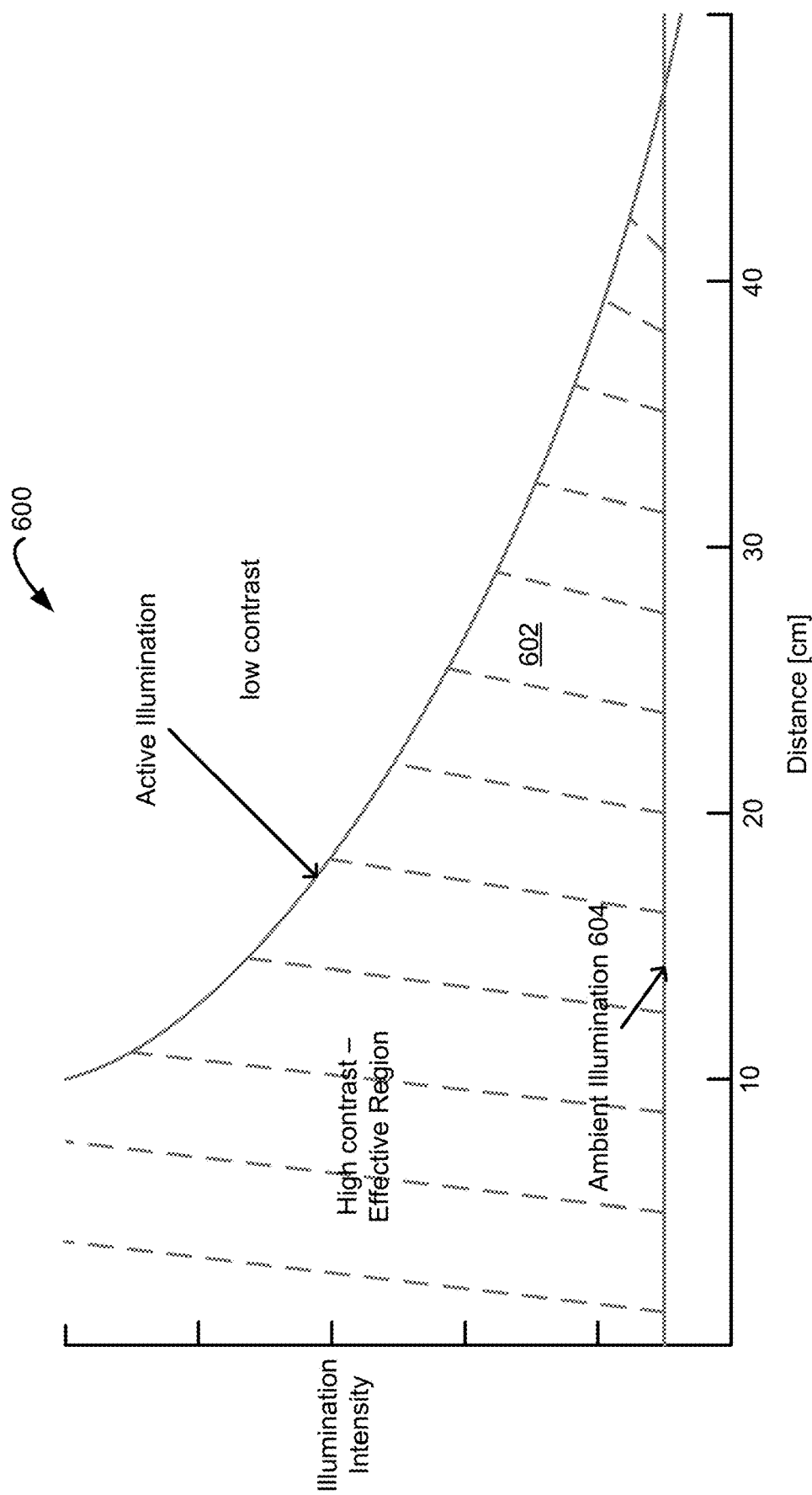
FIG. 6 is an example graph illustrating intensity of light reflected off the surface as a function of the distance between the camera and obstacle on the surface, in accordance with some embodiments.

FIG. 6 is an example graph illustrating intensity of light reflected off the surface as a function of the distance between the camera and obstacle on the surface, in accordance with some embodiments. The effective region 602 of the illumination that provides effective functioning of the obstacle detection system is shown in graph 600. As shown, to obtain the effective region 602, ambient illumination 604 (of the traversed surface) needs to be overcome by the system's light source.

It should be noted that the ambient light refers to the light as measured from the camera and thus is affected from the exposure time and optical filters. Therefore, the ambient light can be reduced, as explained below. Since in the setup of FIG. 4 it is desired to see light reflection from the light source, additional techniques can be used in order to reduce the light scattering from other light sources (i.e. ambient light). For example, powerful high intensity light source can be turned on for a short period of time, synchronized and matched to short exposure time setting of the camera. In another example, a narrow-band light source and use a band pass filter in the camera can be used to block light from the part of the spectra that are not produced by the system's light source. In yet another example, two images of the surface with the obstacle can be taken: one with active emitter and the other one using similar setting but with inactive emitter. One of the resulting images can be subtracted from another in order to get only the illumination provided by the system's light source. The described techniques are complementary and can be applied simultaneously.

Figure 7:
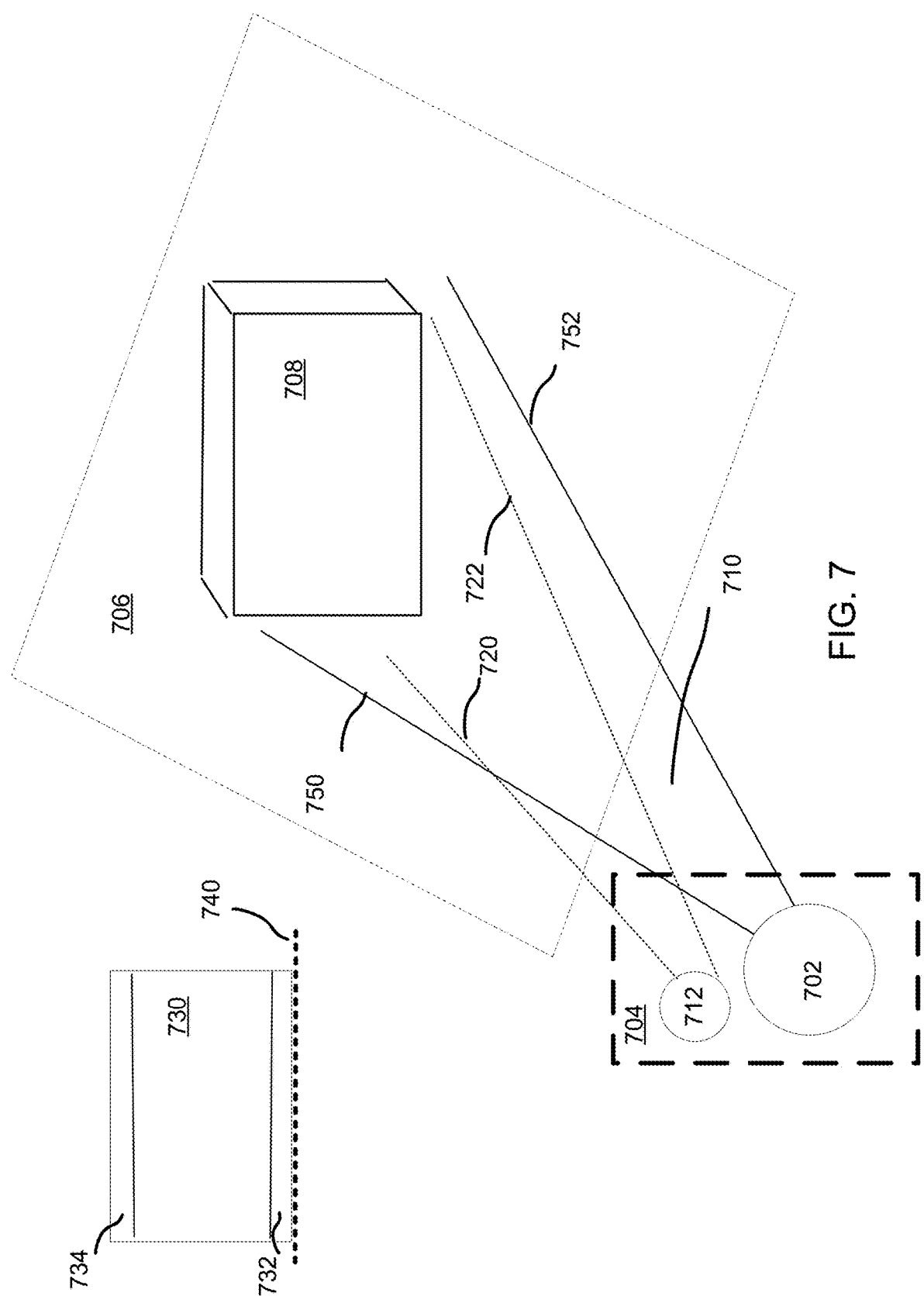
FIG. 7 is an example diagram illustrating operation of an obstacle detection system on a traversed surface, in accordance with some embodiments.

FIG. 7 is an example diagram illustrating operation of an obstacle detection system on a traversed surface, in accordance with some embodiments. The obstacle detection system is shown partially, for purposes of explanation. For purposes of illustration, the diagram is provided in a 2D space, but it is understood that the operation takes place in 3D space. It is also understood that the system shown in FIG. 7 corresponds to the system 400 of FIG. 4.

As shown, the light source 702 of the system is disposed on a robotic apparatus 704 that is configured to traverse a surface, a portion 706 of which is shown in FIG. 7. An obstacle 708 is disposed on the surface 706 and is within the field of view 710 of the light source 702, and is illuminated by the light source 702. The field of view 710 is schematically shown as defined by lines 750 and 752. For purposes of illustration, obstacle 708 is shown in 3D space.

Due to the high contrast of the obstacle to background the obstacle detection can be accomplished as follows. As discussed above, two images of the surface 706 with obstacle 708 can be taken by a camera 710 disposed on the apparatus 704 (as indicated by dotted lines 720 and 722). Namely, a first image of the obstacle illuminated by the light source 702 can be taken, and a second image of the obstacle in the absence of illumination can be taken. Having the illuminated image or the subtraction of the illuminated image from the non-illuminated one, bright regions and dark to bright transition edges can be identified on the obstacle 708 image 730, schematically shown in FIG. 7. Bright regions can be defined as regions (continuous regions of pixels) with significantly higher intensity than their surrounding (e.g., by a predefined value).

Detection of the regions can be done by setting an intensity threshold, which may be different across the field of view 710 to compensate to non-uniformity of the illumination. Within the detected region (e.g., object exterior surface 708 visible to the camera), the pixels at the bottom 732 of the image 730 of the obstacle 708 (also shown in FIG. 4 for clarity) represent the ones that intersect the surface 706 plane (indicated by a dotted line 740) and comprise an edge of the object disposed on the surface 706. The top-most pixels are the top 734 of the obstacle image 730 (also shown in FIG. 4 for clarity) and comprise the top edge of the object (obstacle 708) as detected in the image 730.

In a similar manner, we can use edge detection to detect the same bright regions. In some scenarios, where obstacles have low absorption coefficient compared to the background (i.e. black object on white surface), the obstacle to background contrast may be too small to allow detection. To solve such non-detections, an additional image can be taken with ambient light conditions, where black stands out on light colored surface. Then, edges on the additional image can be detected and fused with the ones detected with the active illumination. The example below illustrates the above considerations. As explained above, the illumination setup creates contrast (at the effective region, e.g., >3). Assume the detection contrast threshold is 1.5. If the object is (much) darker than the surface, i.e., the ratio of the reflectivity coefficient (known as "albedo") of the surface to the reflectivity coefficient of the object is >(3*1/1.5) then the object cannot be detected. However, looking at the image with ambient light, there is a difference in reflectivity coefficient, which allows for detection of the object (which is now darker compared to the background).

In addition to the obstacle detection, estimate the distance to the obstacle and the height of the obstacle can be estimated as described below.

Figure 8:
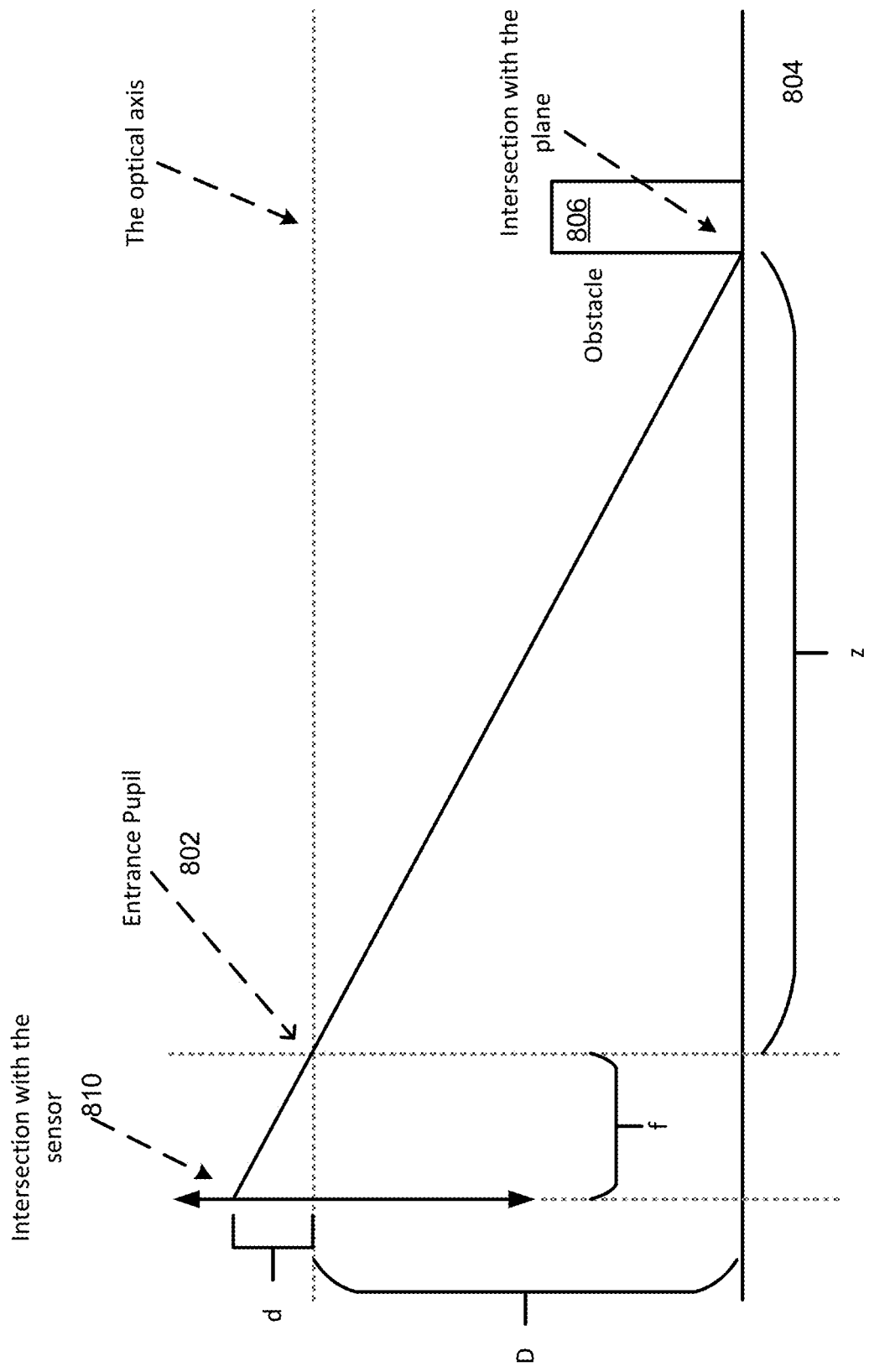
FIG. 8 is an example diagram illustrating an operation of the obstacle detection system to estimate a distance to the object, in accordance with some embodiments.

FIG. 8 is an example diagram illustrating an operation of the obstacle detection system to estimate a distance to the object, in accordance with some embodiments. Specifically, FIG. 8 shows some aspects of system of FIG. 4 operated to estimate the distance to an obstacle on the traversed surface. In embodiments, the camera 802 of the object detection system is disposed at vertical distance D to the surface 804. Assume the surface 804 is planar and the plane geometry (distance from the camera (entrance pupil) 802 to the obstacle 806 and the angle between the sensor plane (the plane on which the image is created) and the traversed plane is known. Using basic geometry, it can be concluded that $$z = \frac{fD}{d} \quad (3)$$

where f is the focal length of the camera (fixed and known), D is the vertical distance of the camera to the surface 804 plane, and d is the distance (on the image plane) of the obstacle intersection 810 with the plane from the camera principle point (fixed and known). In embodiments, d can be extracted with image processing techniques. Accordingly, the horizontal distance z between the camera (camera plane) and the object can be determined.

Figure 9:
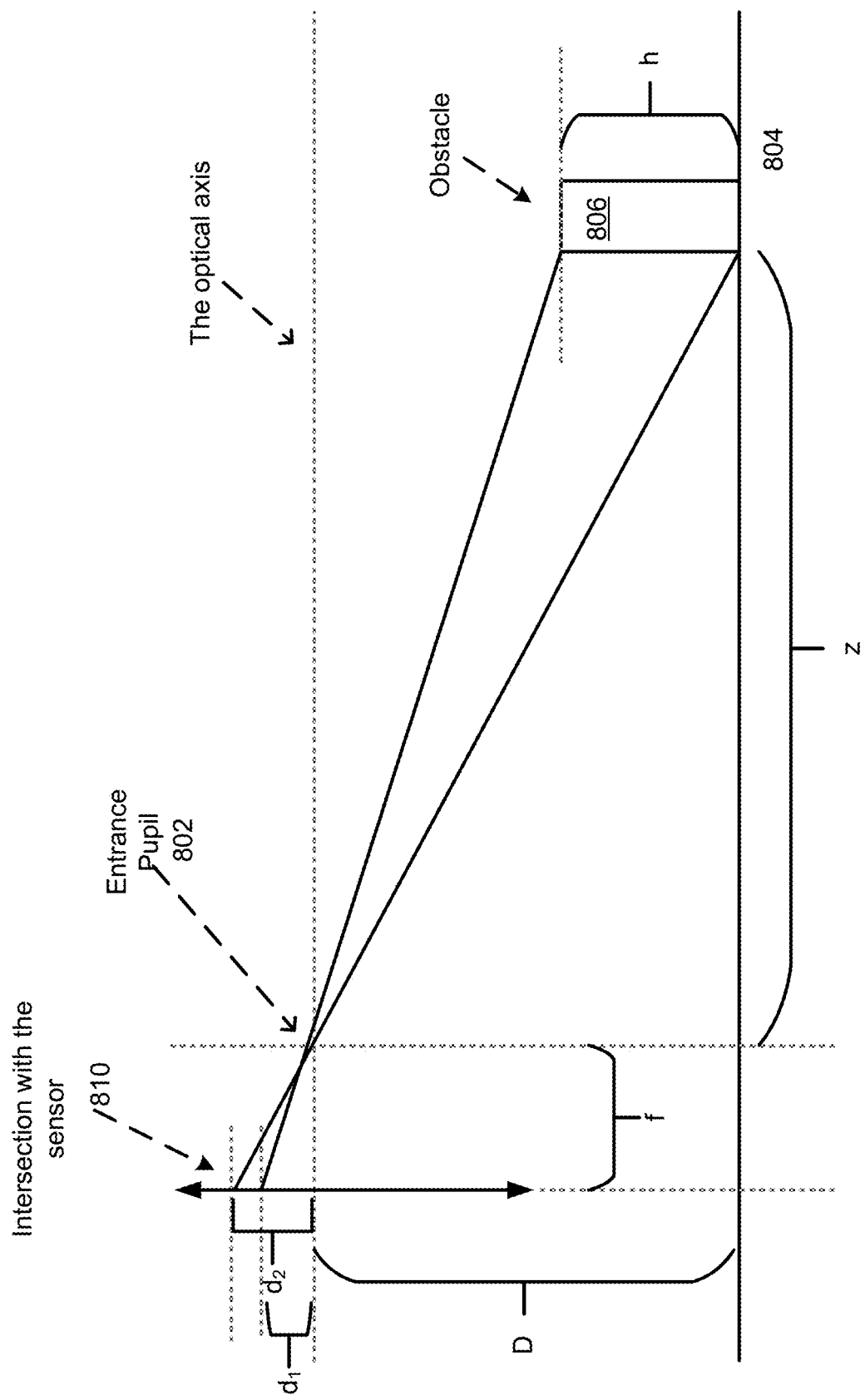
FIG. 9 is an example diagram illustrating an operation of the obstacle detection system to estimate a height of the obstacle on a traversed surface, in accordance with some embodiments.

FIG. 9 is an example diagram illustrating an operation of the obstacle detection system to estimate a height of the obstacle on a traversed surface, in accordance with some embodiments. Specifically, FIG. 9 replicates the setup of FIGS. 4 and 8, with additional callouts provided for purposes of illustration of obstacle height estimation.

Once the distance z is established as described in reference to FIG. 8, the height of the object (obstacle 806) disposed on the surface 804 can be estimated. As can be seen from FIG. 9, with some basic geometry, the height of the obstacle h can be determined as:

$$h = \frac{z(d_2 - d_1)}{f}. \quad (4)$$

Where d1 is the distance (on the image plane) of the obstacle intersection 810 with the plane from the camera principle point, and d2 is the distance (on the image plane) of the obstacle top point (806?) from the camera principle point. The estimation of the distance and height can be extended to non-planar surfaces, as long as the surface geometry is known. When the obstacle detection system described in reference to FIG. 4 is installed on a moving platform (surface traversing robotic apparatus) further analyses can be done. From here on we assume the moving platform has ability to sense its ego-motion (by using, for example visual odometry, simultaneous localization and mapping (SLAM) or the like). The distance between the camera and the object detected by the method above can be filtered using the ego-motion. Assuming the object is static in world coordinates, the following equation $z(t_2)-z(t_1)$ =EgoMotion$_Z(t_2, t_1)$ should be satisfied. Here, $z(t_1)$, $z(t_2)$ are the distances to the obstacle as estimated by Eq. 3 at time $t_1$ and $t_2$, respectively and EgoMotion$_Z(t_2, t_1)$ is the relative motion in z direction during time $t_1$ to $t_2$ as estimated by ego-motion (e.g. visual SLAM). Using this equation, both the absolute distance (z) and the relative z distance (from ego motion) estimations can be combined using common estimation techniques, e.g. Kalman filter to improve the overall accuracy.

In some instances, the embodiments described herein can be used to detect negative step (e.g., discontinuity in the surface having a plane that is lower than the surface reference plane, such as an edge of the surface formed by a cliff, a bluff, a precipice, or an escarpment) for a robotic apparatus.

Figure 10:
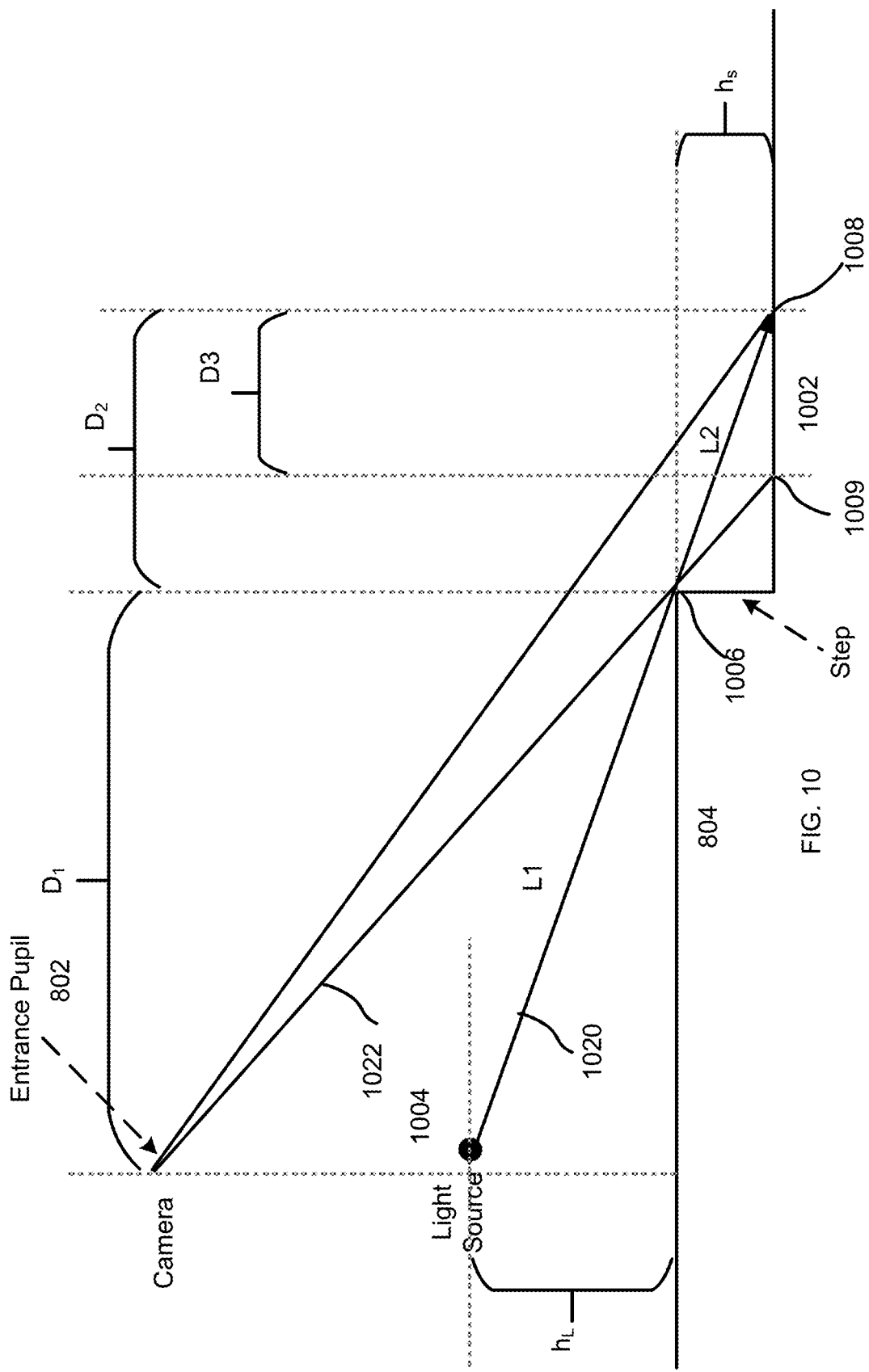
FIG. 10 is an example diagram illustrating an operation of the obstacle detection system to detect a discontinuity on the traversed surface, in accordance with some embodiments.

FIG. 10 is an example diagram illustrating an operation of the obstacle detection system to detect a discontinuity on the traversed surface, in accordance with some embodiments. Specifically, FIG. 10 shows some aspects of system of FIG. 4 (further described in reference to FIGS. 8 and 9) operated to detect a discontinuity on the traversed surface.

In the setup of FIG. 10, the planes of the surface 804 and discontinuity 1002 are parallel. The negative step with a height hs in the discontinuity 1002 results in a change (increase) of the distance between the surface 804 and the light source 1004 from L1 to L1+L2 (shown in FIG. 10), and correspondingly horizontal distance from the camera 802 to the surface 804 from D1 to camera-to negative step D1+D2. As shown in FIG. 10, D1 is a horizontal distance between the camera and the edge 1006 of the discontinuity 1002, D2 is a horizontal distance between the edge 1006 of the discontinuity 1002 and 1008, 1008 is the point of intersection of a ray 1020 (emanating from light source 1004) with discontinuity 1002, hl is a height of the light source 1004 over the surface 804, and D3 is a horizontal distance between 1008 and the closest point on 1002 that is visible by the camera, e.g., the point 1009 of intersection of a line 1022 originating at the camera 802 and intersecting with the discontinuity 1002.

In the setup of FIG. 10, no differences in the normal to the object surface are required at the points of observed discontinuity, e.g., 1006 and 1009. In principle, there may be a difference but it is not relevant to the detection mechanism. The plane region corresponding to D3, which is the region where the light from the light source is both obstructed (i.e. shadowed) and visible by the camera, will be very dark (as it is being shadowed), which means the only ambient light will illuminate it. Thus, we can expect to see very large contrast at the cliff edge (point 1006).

Thus, the contrast can be measured as follows:

$$\text{contrast} = \text{illumination at cliff edge}(1006)/\text{ambient light}(5).$$

If the robotic apparatus with the obstacle detection system is moving on a planar surface, the planar homography between two consecutive images taken from the camera 802 attached to the apparatus can be computed. Using known techniques the traversed surface plane normal can be computed from the planar homography. It is understood that in the description of FIGS. 4, 8, and 9 it was assumed that the relative position of the camera and the traversed surface plane are known. The above description explains how to measure the camera position relative to the traversed surface (e.g., partially—only the plane normal) dynamically.

Assuming the camera height above the plane is fixed and the platform motion between the frames is known, the plane geometry is defined. Another method is to use tilt measurement (e.g., from IMU sensor) as the plane normal. Non-planar surface can be estimated using more elaborated techniques, such as structure-from-motion (SfM).

In order to improve performance the light source may be designed and positioned on the robotic apparatus such that the illumination intensity along the traversed plane and the light intensity along the perpendicular direction to the plane will be as uniform as possible in the relevant obstacle detection range and the illumination source h (height above the plane) range (shown e.g., in FIGS. 4 and 5).

When the obstacles detection apparatus is mounted on a mobile platform (e.g. wheeled robot) the detected obstacles can be combined with other navigation sources (e.g. wheel odometry, Visual SLAM) in order to place the obstacles on a global map. The position of obstacles and the areas where the high confidence that there are no objects on the surface (free space) can be transformed to the navigation coordinates and be marked. The robot can then be guided to move on the free space are, and/or to explore regions that are not marked.

It should be noted that the described embodiments may be implemented on a broader scale, than on a robotic apparatus for surface traversing. In general, the described embodiments may be applied in any technological solution that requires a scene geometry estimation as described in reference to FIGS. 8-10.

Figure 11:
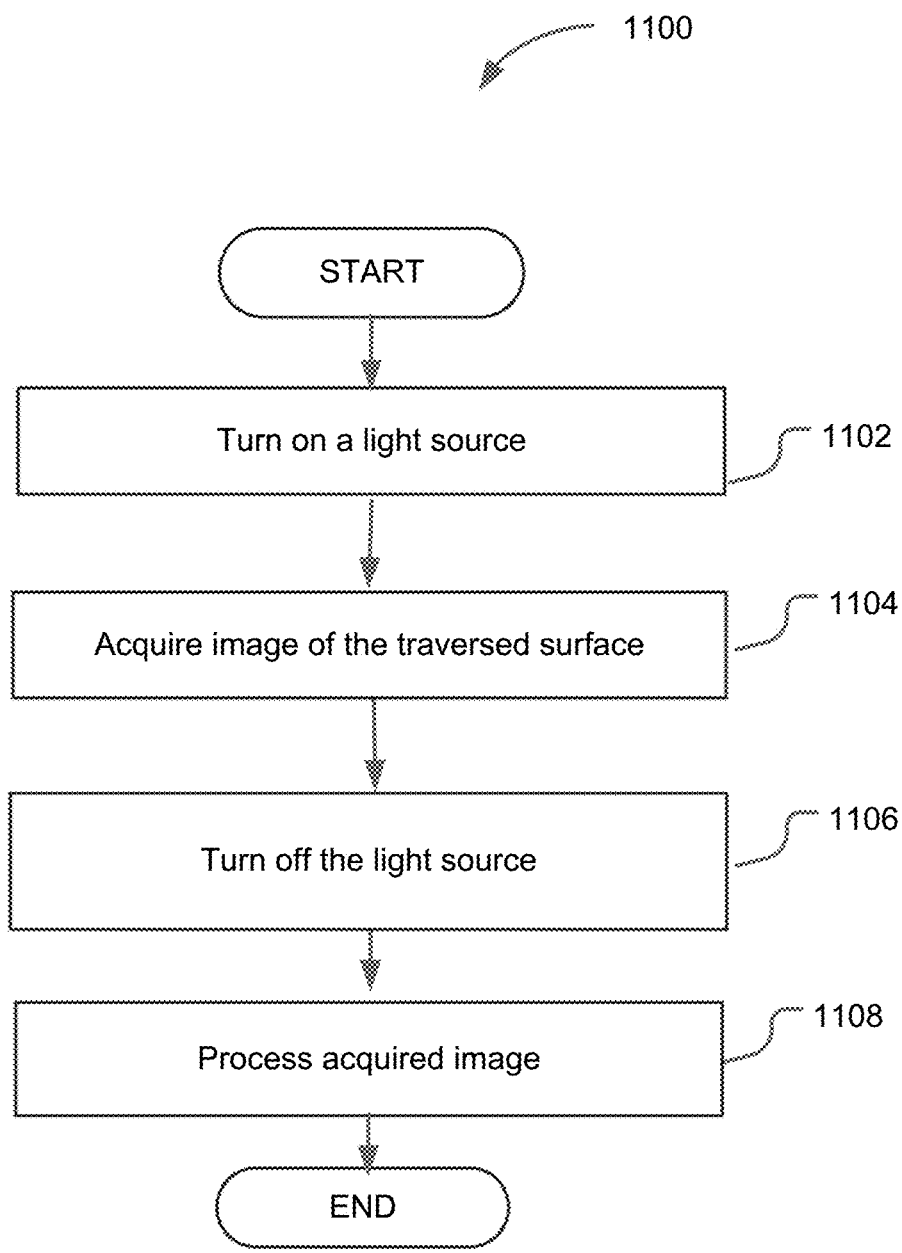
FIG. 11 illustrates a process of operation of the obstacle detection system of FIGS. 1 and 4, in accordance with some embodiments.

FIG. 11 illustrates a process of operation of the obstacle detection system of FIGS. 1 and 4, in accordance with some embodiments. As noted, the obstacle detection system may be mounted on a robotic apparatus, such as apparatus 100 of FIG. 1. The process 1100 may be performed by a processing device of the obstacle detection system, such as the device 124 of FIG. 1.

At block 1102, the processing device causes a light source (e.g., 414 of FIG. 4 or 1004 of FIG. 10) of the obstacle detection system to turn on.

At block 1104, the processing device causes a camera (e.g., 402 of FIG. 4 or 802 of FIGS. 8-10) of the obstacle detection system to acquire an image of the surface traversed by the robotic apparatus.

At block 1106, the processing device causes the light source to turn off.

At block 1108, the processing device causes the images to be processed, in order to detect an obstacle on the traversed image and/or estimate its geometric parameters, as described in reference to FIGS. 5-10.

It will be appreciated that the order of description may not be construed as to imply that the operations of the processes 1100 and 300 are necessarily order dependent. In particular, these operations may not be performed in the order of presentation. At least some or all of the operations of processes 1100 and 300 may be performed in a different order than the described embodiment, as will be evident from the description.

Figure 12:
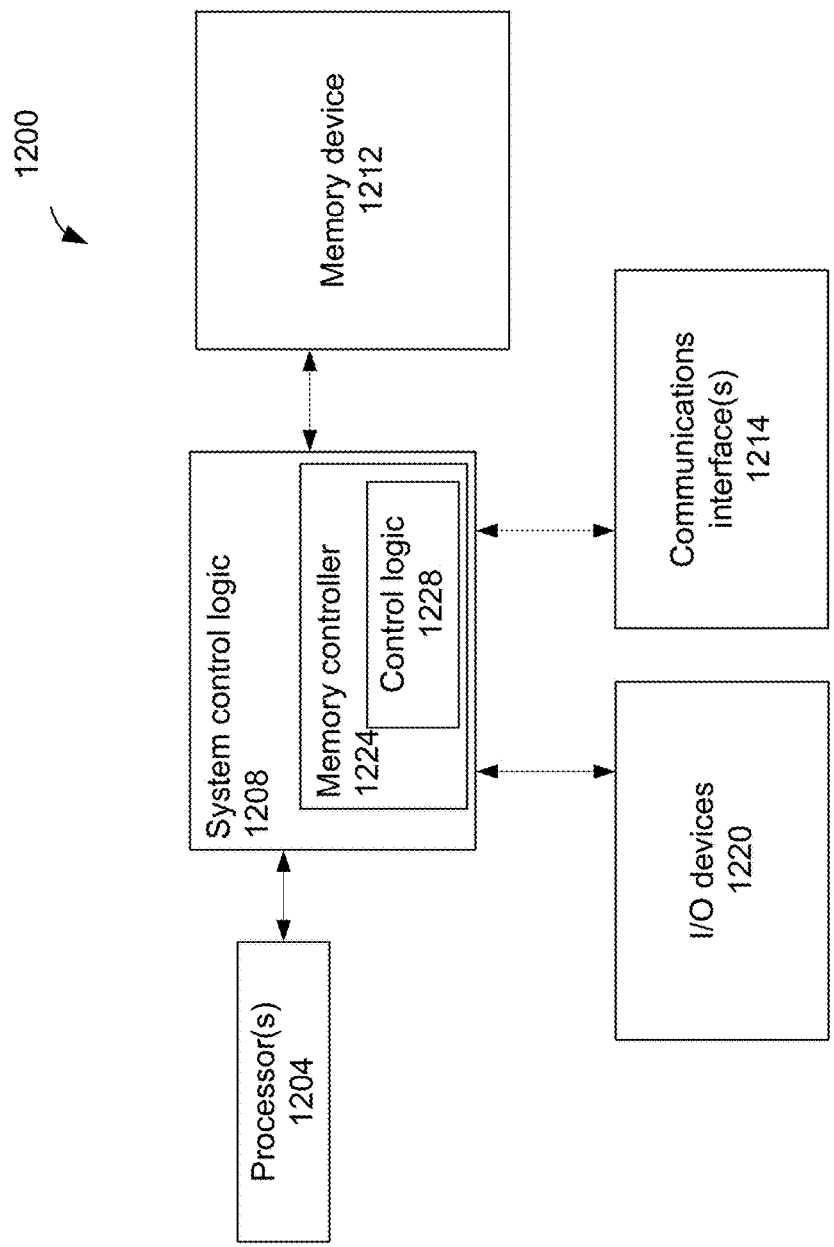
FIG. 12 illustrates an example computing device suitable for use to practice all or selected aspects of the present disclosure, in accordance with some embodiments.

FIG. 12 illustrates an example computing device suitable for use to practice all or selected aspects of the present disclosure, in accordance with some embodiments. More specifically, the computing device 1200 may be configured to perform some or all of the functions of the processing device 124 and/or external computing device 140 of FIG. 1. In some embodiments, the computing device 1200 may be configured as a special purpose computing device, i.e. a computing device configured solely for the purpose of performing operations associated with the surface traversing by a robotic apparatus, such as the processes of FIGS. 3 and 11, and not for general purpose computing, such as processor based devices configured for use as set-top box, game console, smartphones, e-book, tablets for consuming audio/video contents, and so forth. In some embodiments, the computing device 1200 may be configured as a general purpose computing device, with facilities configured to execute virtually any binaries (subject only to computing cycles, and/or memory/storage constraints).

As shown, the computing device 1200 includes system control logic 1208 coupled to one or more processor(s) 1204; a memory device 1212; one or more communications interface(s) 1214; and input/output (I/O) devices 1220.

The memory device 1212 may be a non-volatile computer storage chip. In embodiments, the memory device 1212 comprises a package, driver circuitry (e.g., drivers), input/output connections to electrically couple the memory device 1212 with other components of the computing device 1200, etc. The memory device 1212 may be configured to be removably or permanently coupled with the computing device 1200.

Communications interface(s) 1214 may provide an interface for computing device 1200 to communicate over one or more network(s) and/or with any other suitable device, e.g., in the obstacle detection systems described in reference to FIGS. 1, 2, and 4. Communications interface(s) 1214 may include any suitable hardware and/or firmware. Communications interface(s) 1214 for one embodiment may include, for example, a network adapter, a wireless network adapter, a telephone modem, and/or a wireless modem. For wireless communications, communications interface(s) 1214 for one embodiment may use one or more antennas to communicatively couple the computing device 1200 with a wireless network.

For one embodiment, at least one of the processor(s) 1204 may be packaged together with logic for one or more controller(s) of system control logic 1208. For one embodiment, at least one of the processor(s) 1204 may be packaged together with logic for one or more controllers of system control logic 1208 to form a System in Package (SiP). For one embodiment, at least one of the processor(s) 1204 may be integrated on the same die with logic for one or more controller(s) of system control logic 1208. For one embodiment, at least one of the processor(s) 1204 may be integrated on the same die with logic for one or more controller(s) of system control logic 1208 to form a System on Chip (SoC).

System control logic 1208 for one embodiment may include any suitable interface controllers to provide for any suitable interface to at least one of the processor(s) 1204 and/or to any suitable device or component in communication with system control logic 1208. The system control logic 1208 may move data into and/or out of the various components of the computing device 1200.

System control logic 1208 for one embodiment may include a memory controller 1224 to provide an interface to the memory device 1212 to control various memory access operations. The memory controller 1224 may include control logic 1228 that may be specifically configured to control access of the memory device 1212.

In various embodiments, the I/O devices 1220 may include user interfaces designed to enable user interaction with the computing device 1200, peripheral component interfaces designed to enable peripheral component interaction with the computing device 1200, and/or sensors designed to determine environmental conditions and/or location information related to the computing device 1200.

In various embodiments, the user interfaces could include, but are not limited to, a display, e.g., a liquid crystal display, a touch screen display, etc., a speaker, a microphone, one or more digital cameras to capture pictures and/or video, a flashlight (e.g., a light emitting diode flash), and a keyboard.

In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may additionally/alternatively be part of, or interact with, the communication interface(s) 1214 to communicate with components of a positioning network, e.g., a global positioning system (GPS) satellite.

In some implementations, the computing device 1200 may comprise a general purpose computing device, such as a laptop, a netbook, a notebook, an ultrabook, a desktop computer, or a server. In further implementations, the computing device 1200 may be any other electronic device that processes data.

Figure 13:
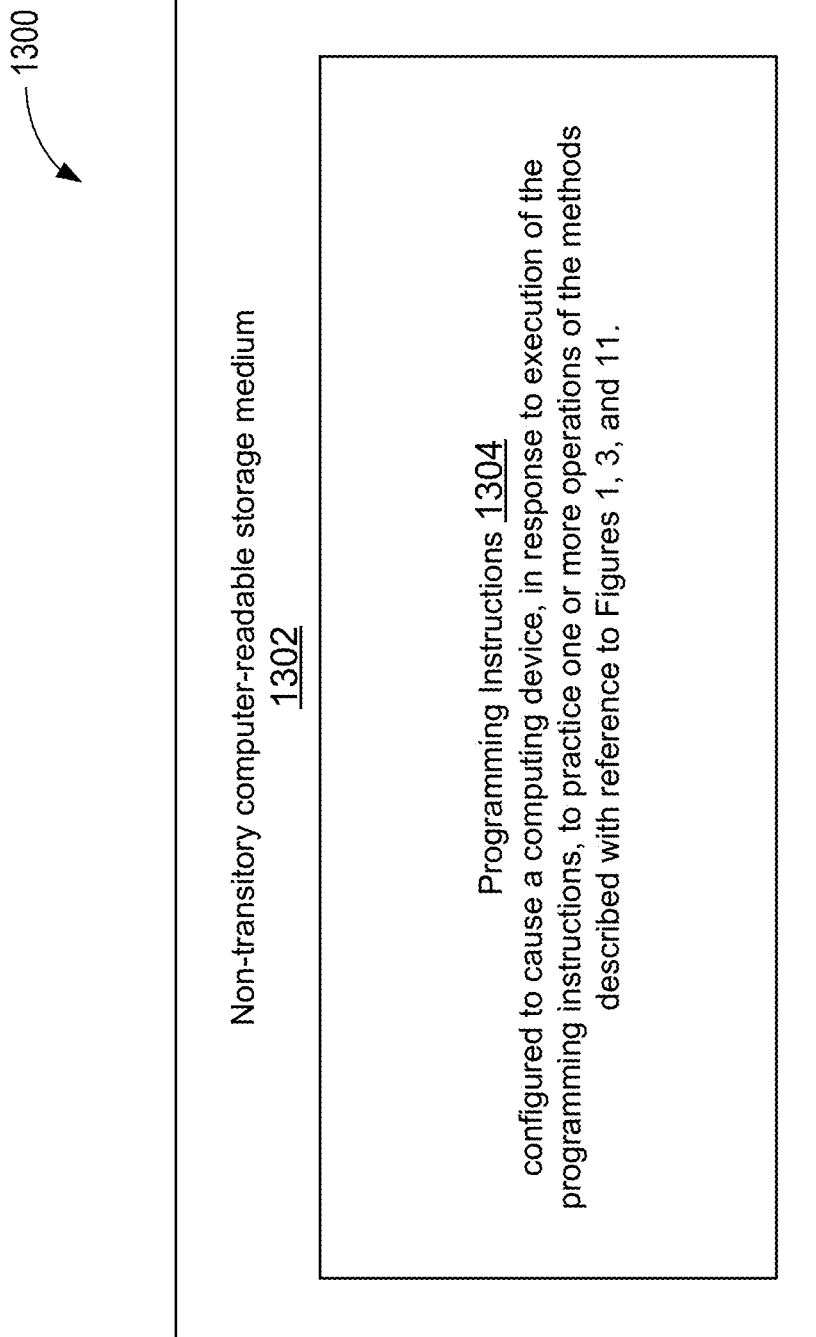
FIG. 13 illustrates an example computer-readable storage medium having instructions configured to cause a processor-based device to practice all or selected aspects of the present disclosure, in accordance with some embodiments.

FIG. 13 illustrates an example computer-readable storage medium having instructions configured to cause a processor-based device to practice all or selected aspects of the present disclosure, in accordance with some embodiments. As illustrated, computer-readable storage medium 1302 may include a number of programming instructions or bit streams 1304. Executable code of programming instructions (or bit streams) 1304 may be configured to enable a device, e.g., computing device 1300, in response to execution of the executable code/programming instructions to perform (aspects of) processes performed by 124, 140, or corresponding components described in reference to FIGS. 1, 3, and 11.

In alternate embodiments, executable code/programming instructions/bit streams 1304 may be disposed on multiple non-transitory computing device-readable storage medium 1302 instead. In embodiments, computing device-readable storage medium 1302 may be non-transitory. In still other embodiments, executable code/programming instructions 1304 may be encoded in transitory computer readable medium, such as signals.

According to various embodiments, the present disclosure describes a number of examples.

Example 1 is an apparatus, comprising: a body of the apparatus; and an obstacle detection system mounted on the body of the apparatus, wherein the system includes: one or more light sources, to illuminate a surface to be traversed by the apparatus; a camera, to capture one or more images of the illuminated surface; and a processing device coupled with the camera and the one or more light sources, to process the captured one or more images, to detect, or cause to be detected, an obstacle disposed on the illuminated surface, based at least in part on a result of the processing of the images.

Example 2 includes the apparatus of Example 1, wherein the processing device is to provide the result of the processing of the images to an external device, to cause the external device to detect the obstacle.

Example 3 includes the apparatus of Example 1, wherein the one or more light sources comprise at least first, second, third, and fourth light sources disposed on the apparatus at different locations relative to the surface, wherein to illuminate the surface includes to turn on in succession the first, second, third, and fourth light sources, wherein to capture one more images includes obtaining, with the camera, corresponding first, second, third, and fourth images of the surface.

Example 4 includes the apparatus of Example 3, wherein the processing device is to control the illumination of the surface with the first, second, third, and fourth light sources, and the capturing of the corresponding first, second, third, and fourth images of the surface with the camera, wherein a time period between capturing of two successive images of the first, second, third, and fourth images comprises a value that provides for a motion of a same pixel present in the two successive images that does not exceed a pixel motion threshold.

Example 5 includes the apparatus of Example 3, wherein the processing device to process the captured one or more images includes to determine a light intensity reflected by the surface in response to the illumination in succession by the first, second, third, and fourth light sources, based on the corresponding first, second, third, and fourth images, estimate geometric parameters associated with the surface, based at least in part on the reflected light intensity, and identify the obstacle based at least in part on the estimated geometric parameters.

Example 6 includes the apparatus of Example 1, wherein the camera is disposed on the body to provide a field of view (FOV) that is common for the one or more light sources and the camera, wherein the FOV comprises at least a portion of the traversed surface.

Example 7 includes the apparatus of Example 1, wherein the one or more light sources comprise a light source disposed on the body of the apparatus at a first distance to the surface, wherein the obstacle is disposed on the surface at a second distance from the camera, wherein the second distance is greater than the first distance.

Example 8 includes the apparatus of Example 7, wherein the second distance is at least three times greater than the first distance.

Example 9 includes the apparatus of Example 7, wherein the one or more light sources are disposed at approximately 3 cm above the surface, wherein the camera is disposed at approximately 5 cm above the surface, wherein the one or more light sources are to illuminate the surface at an acute angle.

Example 10 includes the apparatus of Example 7, wherein the processing device is to control the illumination of the surface with the light sources, and control the capturing of the corresponding image of the surface with the camera.

Example 11 includes the apparatus of Example 7, wherein the processing device to process the captured one or more images includes to determine a light intensity reflected by the surface in response to the illumination by the light source, and identify the obstacle based at least in part on the determined light intensity.

Example 12 includes the apparatus of Example 11, wherein the processing device is to cause the camera to capture a first image when the surface is illuminated with the light sources, and a second image when the surface is not illuminated with the light sources, wherein to process the captured images includes to subtract one of the first or second images from another one of the first or second images.

Example 13 includes the apparatus of Example 11, wherein the processing device is further to determine the second distance between the apparatus and the obstacle, and a height of the obstacle, based at least in part on geometric parameters associated with a distance between the camera and the surface, and a focal length of the camera.

Example 14 is a method, comprising: illuminating, with one or more light sources of a system, a surface in front of the system; capturing, with a camera of the system, one or more images of the illuminated surface; and processing, with a processing device coupled with the camera and the light source of the system, the captured one or more images, including detecting an object disposed on the illuminated surface.

Example 15 includes the method of Example 14, wherein the one or more light sources comprise at least first, second, third, and fourth light sources disposed at different locations relative to the surface, wherein illuminating the surface includes turning on, with the processing device, in succession the first, second, third, and fourth light sources, wherein capturing one or more images of the illuminated surface includes obtaining, with the camera, corresponding first, second, third, and fourth images of the surface.

Example 16 includes the method of Example 15, wherein processing the captured one or more images includes: determining, with the processing device, a light intensity reflected by the surface in response to the illumination in succession by the first, second, third, and fourth light sources, based on the corresponding first, second, second, third, and fourth images; estimating, with the processing device, geometric parameters associated with the surface, based at least in part on the reflected light intensity; and identifying, with the processing device, the object based at least in part on the estimated geometric parameters.

Example 17 includes the method of Example 14, wherein the one or more light sources comprise a light source disposed on the body of the system at a first distance to the surface, wherein the object is disposed on the surface at a second distance from the camera, wherein the second distance is greater than the first distance, wherein processing the captured one or more images includes: determining, with the processing device, a light intensity reflected by the surface in response to the illumination by the light source; and identifying, with the processing device, the object, based at least in part on the determined light intensity.

Example 18 is a system, comprising: one or more light sources, to illuminate a surface; a camera, to capture one or more images of the illuminated surface; and a processing device coupled with the camera and the one or more light sources, to process the captured one or more images, to detect, or cause to be detected, an object disposed on the illuminated surface, based at least in part on a result of the processing of the images.

Example 19 includes the system of Example 18, wherein the system is mounted on an apparatus that is to traverse the illuminated surface.

Example 20 includes the system of Example 18, wherein the one or more light sources comprise at least first, second, third, and fourth light sources disposed at different locations relative to the surface, wherein to illuminate the surface includes to turn on in succession the first, second, third, and fourth light sources, wherein to capture one more images includes obtaining, with the camera, corresponding first, second, third, and fourth images of the surface.

Example 21 includes the system of Example 20, wherein the processing device to process the captured one or more images includes to determine a light intensity reflected by the surface in response to the illumination in succession by the first, second, third, and fourth light sources, based on the corresponding first, second, second, third, and fourth images, estimate geometric parameters associated with the surface, based at least in part on the reflected light intensity, and identify the object based at least in part on the estimated geometric parameters.

Example 22 includes the system of Example 18, wherein the one or more light sources comprise a light source disposed at a first distance to the surface, wherein the object is disposed on the surface at a second distance from the camera, wherein the second distance is greater than the first distance, wherein the processing device to process the captured one or more images includes to determine a light intensity reflected by the surface in response to the illumination by the light source, and identify the object based at least in part on the determined light intensity.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus, comprising:
   a body of the apparatus; and
   an obstacle detection system mounted on the body of the apparatus, wherein the system includes:
   first, second, third, and fourth light sources disposed on the apparatus at different locations relative to the surface, wherein the first, second, third, and fourth light sources are to illuminate a surface to be traversed by the apparatus by turning on, in succession, the first, second, third, and fourth light sources;
   a camera, to capture one or more images of the illuminated surface by obtaining, with the camera, first, second, third, and fourth images of the surface that respectively correspond to turning on the first, second, third, and fourth light sources, and wherein a time period between capturing of two successive images of the first, second, third, and fourth images comprises a value that provides for a motion of a same pixel present in the two successive images that does not exceed a pixel motion threshold; and
   a processing device coupled with the camera and the one or more light sources, to process the captured one or more images, to detect, or cause to be detected, an obstacle disposed on the illuminated surface, based at least in part on a result of the processing of the images.

2. The apparatus of claim 1, wherein the processing device is to provide the result of the processing of the images to an external device, to cause the external device to detect the obstacle.

3. The apparatus of claim 1, wherein the processing device to process the captured one or more images includes to determine a light intensity reflected by the surface in response to the illumination in succession by the first, second, third, and fourth light sources, based on the corresponding first, second, third, and fourth images, estimate geometric parameters associated with the surface, based at least in part on the reflected light intensity, and identify the obstacle based at least in part on the estimated geometric parameters.

4. The apparatus of claim 1, wherein the camera is disposed on the body to provide a field of view (FOV) that is common for the one or more light sources and the camera, wherein the FOV comprises at least a portion of the traversed surface.

5. The apparatus of claim 1, wherein the first, second, third, or fourth light source are a light source disposed on the body of the apparatus at a first distance to the surface, wherein the obstacle is disposed on the surface at a second distance from the camera, wherein the second distance is greater than the first distance.

6. A method, comprising:
  illuminating, with one or more light sources of a system, a surface in front of the system;
  capturing, with a camera of the system, one or more images of the illuminated surface; and
  determining, with a processing device coupled with the camera and the light source of the system, a light intensity reflected by the illuminated surface in response to the illumination;
  estimating, with the processing device, geometric parameters associated with the surface, based at least in part on the reflected light intensity; and
  detecting, with the processing device, an object disposed on the illuminated surface based at least in part on the estimated geometric parameters.

7. The method of claim 6, wherein the one or more light sources comprise at least first, second, third, and fourth light sources disposed at different locations relative to the surface, wherein illuminating the surface includes turning on, with the processing device, in succession the first, second, third, and fourth light sources, wherein capturing one or more images of the illuminated surface includes obtaining, with the camera, corresponding first, second, third, and fourth images of the surface.

8. The method of claim 6, wherein the one or more light sources comprise a light source disposed on the body of the system at a first distance to the surface, wherein the object is disposed on the surface at a second distance from the camera, wherein the second distance is greater than the first distance, wherein processing the captured one or more images includes:
  determining, with the processing device, a light intensity reflected by the surface in response to the illumination by the light source; and
  identifying, with the processing device, the object, based at least in part on the determined light intensity.

9. A system, comprising:
  one or more light sources, to illuminate a surface;
  a camera, to capture one or more images of the illuminated surface; and
  a processing device coupled with the camera and the one or more light sources, to process the captured one or more images, to detect, or cause to be detected, an object disposed on the illuminated surface, based at least in part on a result of the processing of the images;
  wherein the one or more light sources comprise a light source disposed at a first distance to the surface, wherein the object is disposed on the surface at a second distance from the camera, wherein the second distance is greater than the first distance, wherein the processing device to process the captured one or more images includes to determine a light intensity reflected by the surface in response to the illumination by the light source, and identify the object based at least in part on the determined light intensity.

10. The system of claim 9, wherein the system is mounted on an apparatus that is to traverse the illuminated surface.

11. The system of claim 9, wherein the one or more light sources comprise at least first, second, third, and fourth light sources disposed at different locations relative to the surface, wherein to illuminate the surface includes to turn on in succession the first, second, third, and fourth light sources, wherein to capture one more images includes obtaining, with the camera, corresponding first, second, third, and fourth images of the surface.

12. The system of claim 11, wherein the processing device to process the captured one or more images includes to determine a light intensity reflected by the surface in response to the illumination in succession by the first, second, third, and fourth light sources, based on the corresponding first, second, second, third, and fourth images, estimate geometric parameters associated with the surface, based at least in part on the reflected light intensity, and identify the object based at least in part on the estimated geometric parameters.

13. The system of claim 9, wherein the second distance is at least three times greater than the first distance.

14. The system of claim 9, wherein the one or more light sources are disposed at approximately 3 cm above the surface, wherein the camera is disposed at approximately 5 cm above the surface, wherein the one or more light sources are to illuminate the surface at an acute angle.

15. The system of claim 9, wherein the processing device is to control the illumination of the surface with the one or more light sources; and
  control the capturing of the corresponding image of the surface with the camera.

16. The system of claim 9, wherein the processing device to process the captured one or more images includes to determine a light intensity reflected by the surface in response to the illumination by the light source, and identify the obstacle based at least in part on the determined light intensity.

17. The system of claim 16, wherein the processing device is to cause the camera to capture a first image when the surface is illuminated with the light sources, and a second image when the surface is not illuminated with the light sources, wherein to process the captured images includes to subtract one of the first or second images from another one of the first or second images.

18. The system of claim 16, wherein the processing device is further to determine the second distance between the apparatus and the obstacle, and a height of the obstacle, based at least in part on geometric parameters associated with a distance between the camera and the surface, and a focal length of the camera.

* * * * *